Nov. 30, 1971     C. O. STANFORD     3,623,378
CLUTCHING APPARATUS

Filed April 6, 1970     2 Sheets-Sheet 1

INVENTOR
CHARLES O. STANFORD
BY
ATTORNEYS

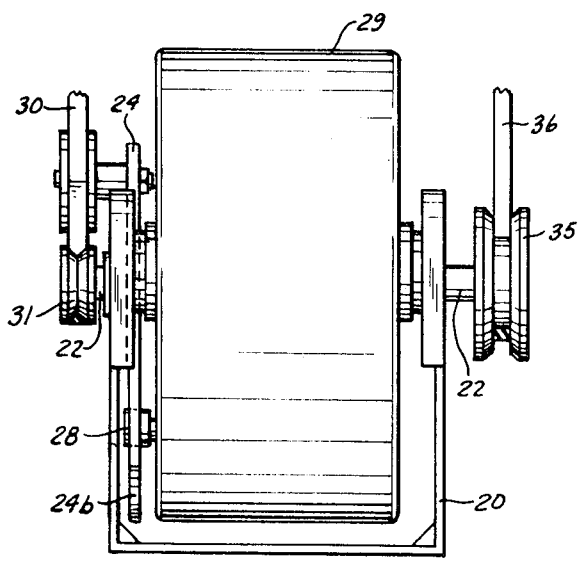

United States Patent Office 3,623,378
Patented Nov. 30, 1971

3,623,378
CLUTCHING APPARATUS
Charles O. Stanford, Effingham, Ill., assignor to
Fedders Corporation, Edison, N.J.
Filed Apr. 6, 1970, Ser. No. 25,752
Int. Cl. F26h 7/08
U.S. Cl. 74—242.9                      6 Claims

ABSTRACT OF THE DISCLOSURE

Clutching apparatus employs the reaction torque of a reversible motor to tension a belt for driving engagement with the motor when the motor operates in a first direction of rotation and to release the belt from driving engagement with the motor when the motor operates in a second direction of rotation. The motor frame is mounted to permit a rotation in either direction in response to the reaction torque generated by the rotation of the motor armature. An arm member responds to the movement of the motor frame to rotate a pulley into belt engagement and disengagement positions.

BACKGROUND OF THE INVENTION

Newton's Third Law of Motion states that for every action there is an equal and opposite reaction. Thus, for example, when a motor shaft rotates in a clockwise direction, equal torque is exeretd on the motor frame in a counterclockwise direction.

Prior art devices have used the above principle in various applications to tension a driving belt. United States Patent No. 2,185,215—McCabe et al., issued Jan. 2, 1940, for example, uses the basic principle and shows a motor frame mounted in such a manner that the reaction torque of the frame, acting through intermediary means, tensions a belt driven by the motor. Further, United States Patent No. 1,262,318, Fitzgerald, issued Apr. 9, 1918, shows belt tightener pulleys, mounted to a generator frame, which are moved in response to the torque on the generator housing to tension the belt driving the generator.

While prior art devices have used the above principle in simple applications to tension a belt, there is no disclosure of its use to provide a clutching function, whereby the driving relation of the belt is completely eliminated at predetermined times.

SUMMARY OF THE INVENTION

The present invention relates to clutching apparatus and, more particularly, to clutching apparatus which uses the reaction torque of a reversible motor to engage a driving belt with the motor when the motor is operating in one direction of rotation and to disengage the driving belt from the motor when the motor is operating in another direction of rotation.

A reversible motor is mounted in a motor bracket in a manner that allows the motor frame to pivot in either direction. A fixed support member is used to establish a fixed pivot placed to the side of the motor. An idler arm is attached to rotate about the fixed pivot established by the support. One end of the idler arm has a pulley which is positioned for rotation into the belt being driven by the motor. The other end of the idler arm is connected either directly, or by means of connecting rod, to the motor frame.

When, for example, the drive shaft and drive pulley of the motor are turned in a clockwise direction, an equal and opposite torque results at the motor frame. The frame, therefore, tends to turn in a counterclockwise direction and rotates the attached idler arm about the fixed pivot. This rotation of the idler arm by the motor frame forces the idler pulley into engagement with the driving belt and causes it to be tightened about the motor pulley. As long as the motor continues to run, the idler pulley engages the belt and maintains the belt in driving engagement with the motor pulley.

When the motor shaft and pulley are driven in the ounterclockwise direction, a torque is exerted on the motor frame in a clockwise direction. The resulting clockwise movement of the motor frame causes the idler arm to rotate clockwise about the fixed pivot and causes the pulley to become disengaged from the belt so that the belt is no longer in driving engagement with the motor pulley.

It is contemplated by way of illustration that the clutching apparatus described above will be used to drive a drying cylinder in a drying apparatus. It may be desirable in such an arrangement to stop the cylinder from rotating, while maintaining a fan in operation so that delicate fabrics may be dried without the tumbling action of the cylinder. With the present apparatus, the driving belt is tensioned between the cylinder and the motor when the motor is driven in a forward direction, and the belt is relieved of tension when the motor is driven in a reverse direction. Thus, in this reverse direction of rotation the belt driving the cylinder is disengaged from the motor and the cylinder is stopped. At the same time, however, another belt driven by a second pulley on the motor operates to drive a fan, so that the drying operation may be carried on without the tumbling action of the cylinder.

BRIEF DESCRIPTION OF THE DRAWINGS

FIG. 3 is a sectional view of the motor clutching apparatus taken along the line 3—3 of FIG. 2.

FIG. 4 is an elevational view of a second embodiment of the motor clutching apparatus of the present invention.

DETAILED DESCRIPTION

Figure 1:
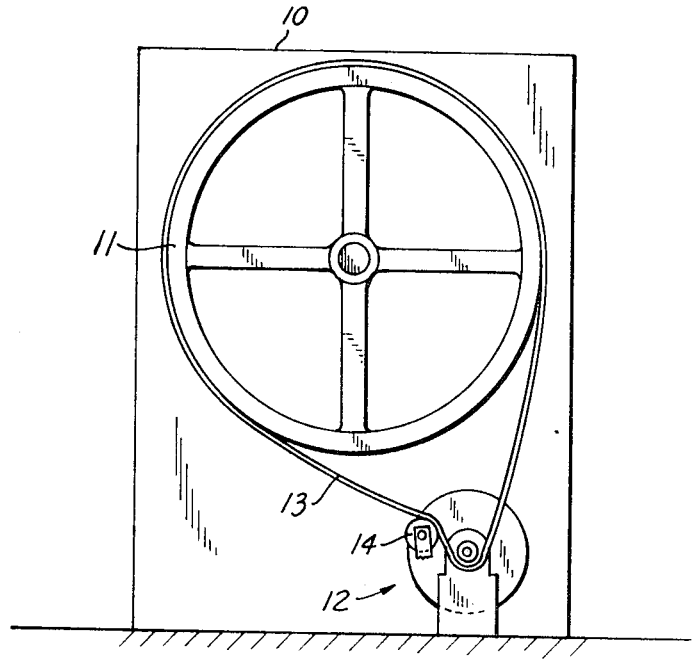
FIG. 1 is an elevational view showing a dryer embodying the motor clutching apparatus of the present invention in a disengaged position.

For purposes of illustration, the motor clutching apparatus of the present invention is shown embodied in a simplified commercial dryer in FIG. 1. The dryer cabinet 10 encloses the drying cylinder 11 and the motor 12 which are shown simply for clarity of illustration.

During the normal drying cycle the drying cylinder 11 is constantly rotated through action of the motor 12. In this case, belt 13 is tensioned, to provide a driving relationship, by the pulley 14. In FIG. 1, however, pulley 14 is shown in a position in which the belt 13 is relaxed and thus released from driving engagement with the motor. As described in more detail below, a pulley, such as pulley 14 is moved in accordance with the present invention to positions that tension and relax the driving belt 13. The disengagement position for pulley 14, as shown in FIG. 1, is used to stop rotation of cylinder 11 though the motor may maintain a fan in operation, so that delicate fabrics may be dried without the tumbling action of the cylinder, through rotation of the motor in an opposite direction.

Figure 2:
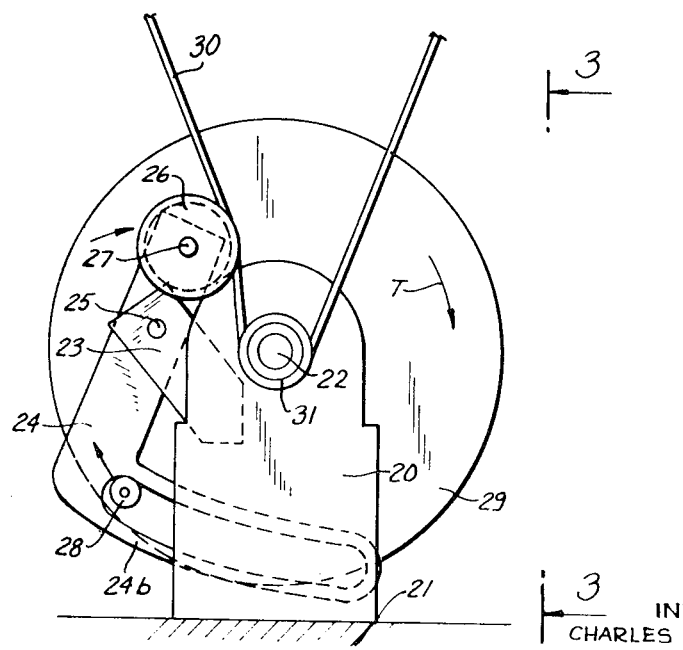
FIG. 2 is an elevational view of a first embodiment of the motor clutching apparatus of the present invention.

A preferred embodiment of the motor clutching apparatus of the present invention is shown in FIG. 2. A bracket 20, secured at 21, supports shaft 22 which is connected to the armature of the motor. Support member 23 is secured to the motor bracket 20 to provide a fixed support for two-arm member 24, which is attached for rotation about pin 25 mounted to member 23. Idler pulley 26, which corresponds to pulley 14 of FIG. 1, is attached to one arm of member 24 by means of pin 27. A stop member 28, fixed to the motor frame 29, is engaged in a slot formed in the other arm 24b of member 24.

Motor frame 29 is free to rotate about an axis centered at shaft 22. As a result of reaction torque, the motor frame rotates in a direction opposite the direction of rotation of the motor armature. When the shaft 22 is rotated in a counterclockwise direction, for example, the motor frame 29 is forced in a clockwise direction. In this case, movement of motor frame 29 causes stop member 28 to move to the left in the slot in arm 24b, as shown in FIG. 2, and thus causes two-arm member 24 to rotate clockwise about pin 25, thereby engaging the pulley 26 with belt 30. Upon engagement of the pulley 26 with the belt 30, the belt is tightened about the motor pulley 31 which is fixed to shaft 22. This causes the belt 30 to be drivingly engaged with the motor pulley 31 so that the belt may drive an independent member, such as the drying cylinder 11 shown in FIG. 1. As long as the motor runs in the counterclockwise direction, the frame is continually forced in the clockwise direction so that the pulley 26 tensions the belt 30 and maintains the belt in driving engagement with the motor, as shown in FIG. 2.

When the armature is rotated in a clockwise direction, the frame 29 is forced in a counterclockwise direction, due to the reaction torque. This causes stop member 28 to move within the slot in arm 24b until it reaches the other end of the slot and rotates the member 24 counterclockwise about the pin 25. This movement of two-arm member 24 acts to disengage the pulley 26 from the belt. The two-arm member 24 continues to rotate counterclockwise about the pin 25 until the arm member engages a stop, not shown, on the motor bracket 20. This stop is the limit of rotation in the counterclockwise direction for the motor frame 29. The disengagement of the pulley 26 from the belt 30 loosens the belt, and prevents driving engagement with the motor pulley 31. As a result, the belt 30 is no longer driven by the motor and the driven cylinder 11 stops rotating.

As indicated above, it may be desirable to continue operation of a second driven member, such as a fan, while stopping the rotation of the drying cylinder 11. To this end, as shown in FIG. 3, a pulley 35 is attached to the other end of the shaft 22 and drives a belt 36. This belt may act to drive a fan which can be operated irrespective of the direction of rotation of the motor shaft 22.

An alternative embodiment of the motor clutching apparatus of the present invention is shown in FIG. 4. The motor bracket 20', shaft 22', pulley 26', pulley 31', motor frame 29' and the belt 30' correspond to the parts referred to by the identical unprimed members in FIGS. 2 and 3. In FIG. 4, a support member 40 is attached to the motor bracket 20'. Two-arm member 41 is attached for rotation about pin 42 at one end of the supporting member 40. Pulley 26' is attached to arm 41a of two-arm member 41 by pin 44. The other arm 41b of two-arm member 41 is attached to link member 45 by means of pin 46. Link member 45 is attached to motor frame 29' by means of pin 47.

In the operation of the embodiment shown in FIG. 4, the pulley 26' is rotated into engagement with the belt 30' when the motor shaft 22' is driven in a clockwise direction. Briefly, the rotation of the shaft 22' in a clockwise direction forces the motor frame 29' in a counterclockwise direction. This movement pulls pin 47 and link member 45 to the right as shown in FIG. 4 and rotates the two-arm member 41 in a counterclockwise direction about pin 42. The movement of link 45 and two-arm member 41 forces the pulley 26' into engagement with belt 30', tightening it so that the belt is engaged with the motor pulley 31'. So long as the motor is rotated in a clockwise direction the frame maintains the pulley 26' in engagement with the belt 30'.

Upon rotation of the shaft 22' in a counterclockwise direction, the motor frame 29' is forced to rotate in a clockwise direction. This rotation of the motor frame forces the link 45 to the left and rotates the two-arm member 41 in a clockwise direction about pin 42. This rotation of the two-arm member 41 disengages the pulley 26' from the belt 30'. As a result, the belt 30' is relaxed and is no longer in driving engagement with the motor pulley 31' so that the external driven member, such as cylinder 11 shown in FIG. 1, is stopped. The rotation of the frame 29' in the counterclockwise direction is limited after disengagement of the pulley 43 from the belt 30' by a stop, not shown, on the motor bracket 20'.

It may be noted, of course, that the embodiment shown in FIG. 4 may also contain a pulley, similar to that indicated by pulley 35 in FIG. 3, which would drive a second belt, such as 36, to maintain a fan or a second driven member in operation after the disengagement of the belt for the first driven member. It may also be readily seen from the description above, that a second clutching apparatus, such as shown in either FIG. 2 or FIG. 4, may be applied to replace the simple pulley 35 and belt 36, shown in FIG. 3, so that a first driven member is drivingly engaged with the motor only on rotation of the motor in a first direction while a second driven member is drivingly engaged with the motor only on rotation of the motor in a second direction.

What is claimed is:
1. Apparatus comprising:
   a reversible motor having an armature and a frame;
   means supporting said frame for rotation;
   a driving member connected to said motor armature;
   a belt connected between said driving member and a driven member;
   tensioning means engageable with said belt; and
   means responsive to the rotation of said motor frame in a first direction to engage said tensioning means with said belt and responsive to movement of said frame in a second direction to disengage said tensioning means from said belt and release said belt from driving engagement with said motor.

2. Apparatus in accordance with claim 1 wherein said tensioning means includes an idler pulley rotated by said frame into and out of engagement with said belt.

3. Apparatus comprising:
   a reversible motor having an armature and a frame;
   a driving member connected to said armature;
   a belt connected between said driving member and a driven member;
   means for supporting said motor frame for rotation about a fixed axis concentric with said armature, said frame rotating about said axis in a direction opposite the direction of rotation of said armature;
   tensioning means engageable with said belt; and
   means responsive to the movement of said motor frame in a first direction to engage said tensioning means with said belt and responsive to the movement of said motor frame in a second direction to disengage said tensioning means from said belt and release said belt from driving engagement with said motor.

4. Apparatus in accordance with claim 3 wherein said means responsive to the rotation of said motor frame includes a first member attached to said frame and a second member pivoted about a second fixed axis and having a slot positioned such that said first member engages the ends of said slot upon rotation of said frame from a first position to a second position to initiate movement of said second member and said tensioning means.

5. Apparatus in accordance with claim 3 wherein said means responsive to the rotation of said motor frame includes a link member attached to said frame and an arm member pivoted about a second fixed axis and connected between said link member and said tensioning means, said link member rotating said arm member about said second axis.

6. Clutch apparatus for a dryer comprising:
a reversible motor having an armature and a frame;
means for supporting said motor frame for rotation about a fixed axis concentric with said armature;
first and second driving means connected to said armature;
a first belt connected between said first driving means and a drying cylinder;
a second belt connected for continuous driving engagement with said second driving means;
tensioning means engageable with said first belt;
means responsive to the movement of said motor frame in a first direction for engaging said tensioning means with said first belt to provide for rotation of said cylinder, and responsive to the rotation of said motor frame in a second direction for disengaging said tensioning means from said first belt to release said belt from driving engagement with said motor to stop said cylinder.

References Cited

UNITED STATES PATENTS 3,057,218    10/1962    Knerr et al. _____ 74—242.9

FOREIGN PATENTS 918,162    2/1963    Great Britain _____ 74—242.9

FREDERICK L. MATTESON, Jr., Primary Examiner

T. W. STREVLE, Assistant Examiner

U.S. Cl. X.R.

74—242.11, 242.15; 34—133